Sept. 21, 1937. E. B. HUDSON Re. 20,511

AUTOMATIC SHEAR GAUGE FOR CAMBERED STRIP

Original Filed April 11, 1935 2 Sheets-Sheet 1

INVENTOR.
EDWIN B. HUDSON.

BY Allen & Allen
ATTORNEYS.

Sept. 21, 1937. E. B. HUDSON Re. 20,511

AUTOMATIC SHEAR GAUGE FOR CAMBERED STRIP

Original Filed April 11, 1935 2 Sheets-Sheet 2

INVENTOR.
EDWIN B. HUDSON.
BY Allen & Allen
ATTORNEYS.

Reissued Sept. 21, 1937 Re. 20,511

UNITED STATES PATENT OFFICE 20,511

AUTOMATIC SHEAR GAUGE FOR CAMBERED STRIP

Edwin B. Hudson, Middletown, Ohio, assignor to The American Rolling Mill Company, Middletown, Ohio, a corporation of Ohio Original No. 2,056,194, dated October 6, 1936, Serial No. 15,838, April 11, 1935. Application for reissue July 23, 1937, Serial No. 155,296

14 Claims. (Cl. 164—59)

My invention relates to cutting metal sheets or strips, and to gauges employed in connection with such operations; and more especially to gauges acting at a longitudinal edge of a sheet or strip to effect a desired relation of an end portion of the sheet or strip to a means which trims an end of the sheet or strip. My invention is particularly related to those operations in which hot rolled sheets or strips are to be welded together end to end, preparatory to cold rolling of the greater length of metal thus afforded. This uniting of a number of strips or sheets in a much longer unit is of advantage in providing longer coils for a single stand cold reduction mill; also, in this way, it is possible to provide a single band of metal running through a series of cold mills arranged in tandem.

In order to form a proper supply of metal for the mill or mills, it is necessary for the individual strips to be welded together in proper relation to the camber therein, if any, and it is a fundamental object of my invention to provide a shearing device for cutting the ends of the strips in such a way that such welds may be made. The reasons for this will become apparent as the description proceeds; and the objects mentioned, and other objects of my invention which will be set forth hereinafter or will be apparent to one skilled in the art upon reading these specifications, I accomplish by that certain construction and arrangement of parts of which I shall now describe a preferred embodiment, reference being had to the accompanying drawings in which:

Figure 2:
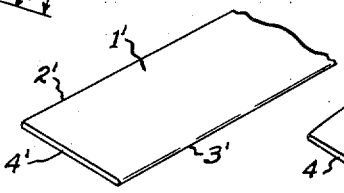
Fig. 2 is a perspective view of a portion of a strip without camber.
Figure 3:
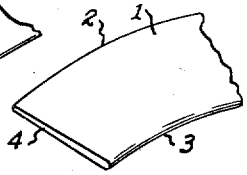
Fig. 3 is a similar view of a portion of a strip with camber, the uneven thickness and the camber of the strip being greatly exaggerated.
Figure 4:
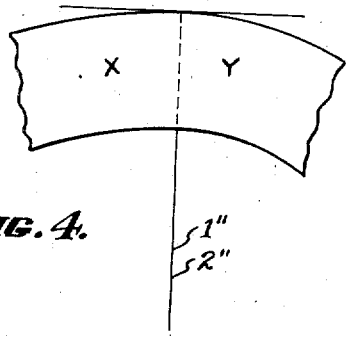
Fig. 4 illustrates the proper junction of two cambered strips end to end with the cambers of the two strips both in the same direction, the cambers being greatly exaggerated.
Figure 6:
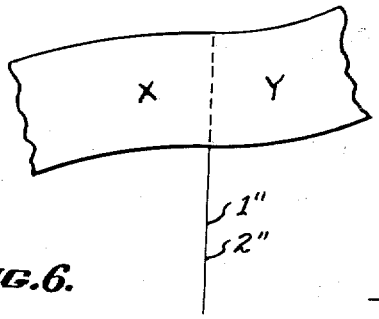
Fig. 6 is a view similar to Fig. 4, showing a proper junction of cambered strips where one strip has its camber in direction opposite to that of the other.

In the hot rolling of strip metal, the theoretical condition exemplified in Fig. 2 is not consistently attained. Here the strip 1 has parallel side edges 2′ and 3′, and parallel face portions, as shown in section at 4′. On the contrary, due to a number of causes which it is not necessary to outline here, these causes being well known, hot rolled strip is subject to camber, at least at intervals. Such a condition is exaggerated in Fig. 3, where, as shown in the section at 4, the faces of the sheet are not parallel, but converge toward one edge. This is indicative of a condition in which one edge of the strip, the edge 2 in the illustration, is being rolled somewhat thinner than the edge 3, and therefore is being elongated by a greater amount. The thinner edge 2 therefore becomes the longer edge, and the strip is given a curvature. The conditions producing camber are more or less sporadic, and cambered portions in the strip therefore occur with irregularity, and the curvature produced thereby will be irregular and will not always be in the same direction. Ordinarily hot rolled strip, although cambered, has substantially a uniform weight per lineal length unit, and when further reduced in gauge by subsequent rolling operations, and when given a uniform cross section as illustrated in Fig. 2, will straighten out and loose its camber. Difficulties are met, however, when attempts are made to weld the cambered pieces end to end to make a length or a continuous supply of metal, say, for tension cold rolling operations. Here, if the camber is to straighten out as indicated, the conditions in the welded piece must approximate the conditions in a single cambered strip from the hot mills. It has been found that these conditions are met if cambered pieces can be sheared radially of the camber therein at the point of shearing, and butt welds made in strips thus sheared. When cambered pieces are sheared radially and welded, it makes no difference whether the camber in the strips is in the same direction on each side of the line of weld. Figs. 4 and 6 show, with considerable exaggeration, properly sheared and welded cambered strip, Figure 4 indicating the proper condition when the cambers in the two strips happen to be in the same direction, and Fig. 6 indicating the proper condition when the cambers are in opposite directions. The lines of proper shearing 1'' and 2'' coincide in these instances.

Figure 5:
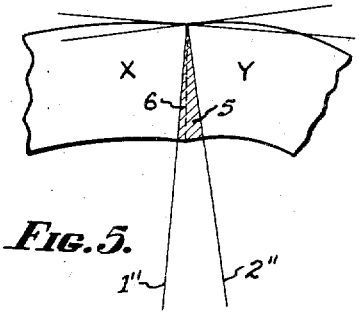
Fig. 5 is a similar view illustrating an improper junction of two cambered strips with the cambers or strips both in the same direction.
Figure 7:
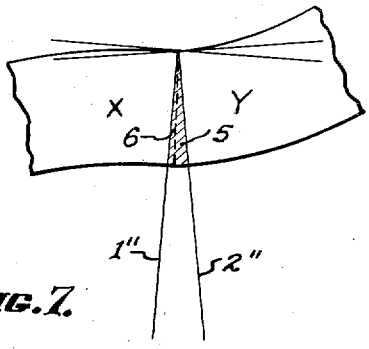
Fig. 7 is a similar view illustrating an improper junction of cambered strips with their cambers related as in Fig. 6.

Figs. 5 and 7 illustrate corresponding improper conditions upon an exaggerated scale. Here the lines of cut and weld are represented by the dotted lines 6. Lines of cut radially of the cambers are again represented by the lines 1'' and 2'', and it will be noticed that there lies between these lines of proper cut, a triangular area of metal 5, which is excess metal in the sense that it is metal which would not be there in a cambered strip which had not been cut or welded. This triangular area of excess metal will prevent the strips straightening out and loosing their camber under subsequent rolling conditions. The strips joined together are indicated in Figs. 4 to 7, inclusive, at X and Y.

It follows that if cambered strips are sheared radially of the curvature of the camber therein, and are welded together, a proper supply of metal will be produced. It is very difficult, however, to gauge by eye the curvature of the camber and to make a radial cut, and it is impracticable in production work to use measuring devices for this purpose.

My invention is adapted to provide a means for quickly and accurately determining a direction of cut which will be accurately radial to any degree of camber there may be in the strip.

In my invenion, I provide a gauge which contacts either edge of the strip 1 at a plurality of spaced locations, and provides for bringing the contacting portions of the gauge into correct relation to each other and to the sheet, automatically incident to pressure of the sheet edgewise against the contacting portions, such that the end portion of the strip which is to be sheared will have the shear blades approximately radial to the curve of its edges, whatever be the degree of the curvature.

Figure 1:
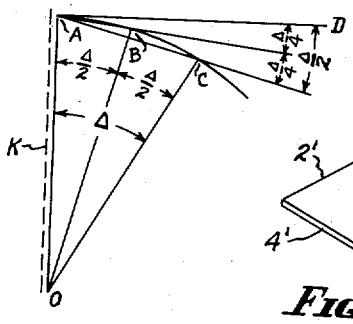
Figure 1 is a diagram illustrating, with exaggerated dimension, the principle upon which my invention is based.

The mathematical principle of my invention is illustrated in Figure 1. Points A, B, and C represent three points along a curve ABC, which may be either the edge 2 or the edge 3 of a cambered sheet or strip. Point C, therefore, is twice as far from point A, as is point B, as designated between the radii from point O; AOC being the angle $\Delta$, and AOB and BOC each being the angle $$\frac{\Delta}{2}$$

Also the angle ADC between tangent AD and chord of angle AOC is $$\frac{\Delta}{2}$$

and this angle ADC is bisected by chord AB, defining two angles each designated $$\frac{\Delta}{4}$$

It may easily be seen that these proportions will be constant, whatever the degree of curvature ABC, so long as AB equals BC.

In the actual construction of my device, I provide two arms pivoted together, and to a supporting means at A, corresponding to A of the diagram. There is a mechanical or other interconnection between these members, such that as one of the arms swings through a given arc, the other arm must swing through an arc which is half as great or twice as great, as the case may be. That arm which moves through the greater angle bears near its outer end a contact member C (see Fig. 8), and the other arm bears a contact member B, at a radial distance from A half as great as the distance of C from A. It will be clear that at one position in the swing of the arms, the contact points A, B, and C will lie along a straight line. At other points in their swing, the points A, B, and C will lie along regular curves. The points A, B, and C will lie in a straight line along the dotted line "L" in Fig. 8. They will also lie along the curves which have been indicated in dotted lines at M and N. If a line is drawn from the point A perpendicular to the line N, it will be seen that this perpendicular line will always be the radial line of any regular curve along which the points A, B, and C lie. Thus if a shear blade 9 is arranged close to the point A and perpendicular to the line L, it will make a radial cut in any piece of cambered material placed on the table and brought simultaneously into contact with the contacting members A, B, and C.

In the exemplary construction illustrated, the shear frame 7 has the shear blades 8 and 9 mounted for coaction in the usual manner, so that a sheet or strip fed from either table 10 or 11 between the blades will have a portion sheared from it as the blade passes downward in coaction with blade 8. A gauge constructed according to my invention is provided along the edge of each table 10 or 11, and is enclosed in a casing 12, seen in full for the left hand gauge in Figs. 8 and 9. The gauge at the right has a casing shown in section, revealing the mechanism of the gauge; and this right hand gauge will be referred to; it being understood that the left hand gauge simply has its parts arranged inversely to those of the right hand gauge. The parts of the left hand gauge are numbered the same as corresponding parts of the right hand gauge. It will be understood that the casings 12 are suitably firmly mounted on the shearing machine.

Adjacent to the shear frame 7, the casing has a corner opening 13; and has projections 14 at top and bottom supporting the pivot 15 for the two arms 16 and 17, one above the other. These arms are bent so that their main portions may lie within the casing 12, with end portions extending out through the opening 13 and converging to the pivot 15. The portions of the arms that surround the pivot have on their sides facing in across the table 10 or 11, suitable bearing means for engagement with the edges of sheets or strips to be gauged; and the effective point of engagement represents the point A, in Fig. 1.

It will be noted that these pivots 15 necessarily are spaced from the line of cut of the shear blades 8 and 9; the line of cut being represented by the broken line "K" in Fig. 1. This spacing, of course, is so slight that the departure from radial cut will not be appreciable.

The arm 17 has at its free end a finger 19, projecting in across the table 10 or 11 through a slot 18 in the casing 12, and the other arm 16 has a finger 20 projecting in under the arm 17 and through a slot 21 in the casing 12. These fingers 19 and 20 have upright end members 23 and 24 respectively, each provided with means for contacting the sheet or plate edge, like that provided at the pivot 15. The contact means on finger 19 is twice as far from the contact means at pivot 15, as is the contact means on the finger 20. Also the parts are so proportioned that at a certain relative position of the two arms 16 and 17, the contact means at pivot 15, at the arm 20 and at the arm 19, are along a straight line L at right angles to the line of cut of the shear blades 8 and 9. It will be seen that the contact means at pivot 15 and the two fingers 20 correspond to the points A, B, and C, respectively, of the diagram of Fig. 1.

Figure 8:
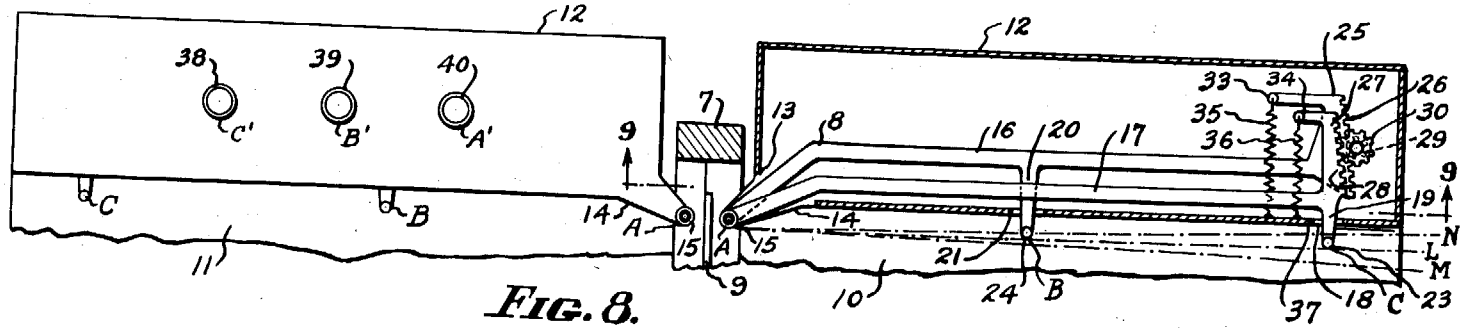
Fig. 8 is a plan view of one side portion of a shearing machine and its table, with my invention applied thereto.

The relative positions of the two arms 16 and 17, illustrated in Fig. 8 and their points, are those for engaging an uncambered sheet or strip to be sheared squarely by the shear blades, the strip having a straight edge corresponding to the line L.

Figure 9:
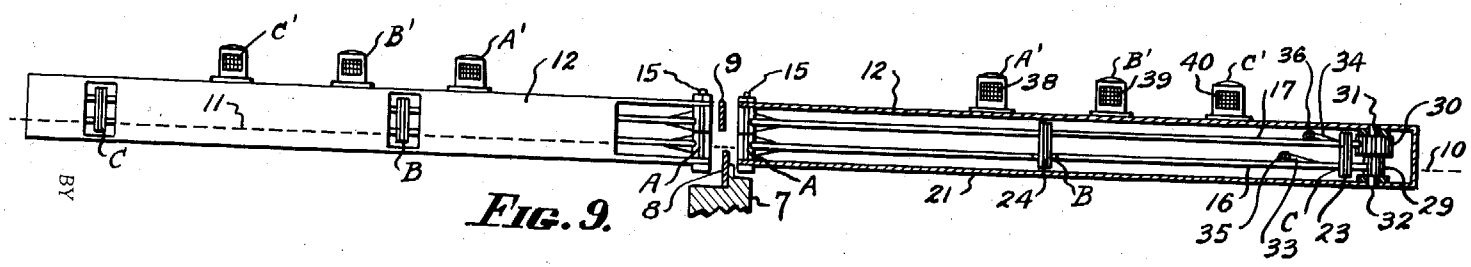
Fig. 9 is a sectional side elevation of the same, the section being longitudinal through the inner side of the casing of my invention on the line 9—9 of Fig. 8, and through the shear knives and bed, and indicating the top surfaces of the tables by a broken line.

The means which I have here illustrated for insuring that arm 17 will swing twice as far as arm 16, when either arm is moved, comprises gear teeth on the respective arms, and gears meshing with the teeth. This may be seen clearly at the right in Figs. 8 and 9, where arm 16 has an outward projection 25, with the gear teeth 26 concentric with and presented radially outwardly from the pivot 15 of the two arms. Similarly the arm 17 has an outward projection 27, with gear teeth 28 also concentric with and facing radially outwardly from the pivot 15, but along an arc of radius less than that of the teeth 26 of the other arm 16. Two spur gears 29 and 30 are concentric and fixed together; the larger gear 30 meshing with the teeth 28 of arm 17, and the smaller gear 29 meshing with the teeth 26 of the arm 16. The parts are so proportioned that the gear 30 is of pitch diameter twice that of gear 29. These gears on a vertical axis, have bearings 31 and 32 in the top and bottom of the casing 12, as seen in Fig. 9.

By the above arrangement, if arm 17 is swung, it will act through the gears and gear teeth to swing the arm 16 only half as far; or if arm 16 is swung it will act by the same means to swing arm 17 twice as far. Thus, the action will be according to the principle illustrated in Fig. 1.

The projections 25 and 27 have extensions 33 and 34, respectively, on their outer ends, to which springs 35 and 36, respectively, are connected; these springs being connected to the casing wall so as yieldingly to hold the arms 16 and 17 in toward the table 10 or 11. The limit of this spring action is provided by a suitable stop, as for instance, the arm 17 engaging the edge 37 of the opening 18 in the casing wall. This, of course, would be arranged to provide for the greatest expected degree of curvature of a sheet or strip edge as represented by the line M in Fig. 8, which line would be touched by all three points A, B and C. Similarly, line N, Fig. 8, represents the greatest expected curvature in the opposite direction.

If the operator places a sheet or strip on the table 10 and pushes it toward the three points A, B, and C, the gauge will act, by the regulated difference of movement of its two arms 16 and 17, to establish positions of the two arms in which their contacts and the contact at pivot 15 will all be engaged by the curved edge of the sheet. The operator may, for example, bring a strip against the point A, and swing it about this point as a pivot until the strip edge also contacts points B and C. When this condition obtains, the shear blades are in a position to make a radial cut for reasons which have been explained.

It would involve considerable attention and labor on the part of the operator to insure that all three points A, B and C were contacted by the edge of the sheet or strip, if he had to inspect each one of these points directly. Accordingly, I provide electric lamps A′, B′, and C′, preferably mounted in screened hoods 38, 39, and 40, respectively, on the top of the casing 12, with the lights visible from the operator's position across the table from the gauge; and I provide for control of the current to the several lamps through the contact means, previously mentioned, on the pivoted portions of the arms and on the upstanding end members 23 and 24 of fingers C and D.

Figure 11:
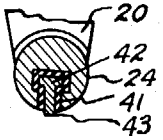
Fig. 11 is a horizontal cross section of the same on the line 11—11 of Fig. 10.
Figure 10:
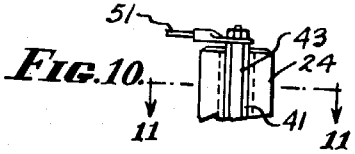
Fig. 10 shows in fragment the electric connection with one of the contact fingers.

Suitable means for enabling these parts to control the current are illustrated in Figs. 10 and 11. These figures show one of the upstanding end members of a finger, for instance, the finger 20; it being understood that the same construction is used on the members of both fingers 20 and 19, and may be used on the pivot parts of the arms 16 and 17. The construction embodies a longitudinal T-slot in the upstanding member, lined with insulating material 41, and holding a T-bar 42 of electrically conductive material. The web of the bar 42 projects, as at 43, past the face of the part 42. It is this conductive edge portion 43 that represents the point B, for the finger 20, since it is the part which actually contacts the strip edge.

Figure 12:
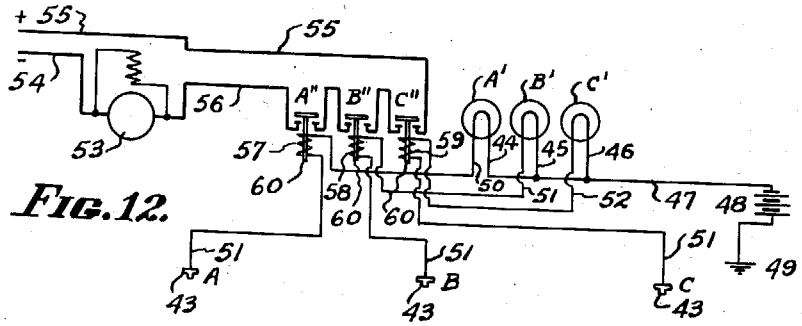
Fig. 12 is a diagram showing the electrical system comprised in my invention.

The electrical connections are clearly shown in the diagram in Fig. 12, where it will be seen that each lamp A′, B′ or C′ has one terminal 44, 45, or 46 connected through conductor 47 with one terminal of a current source 48, the other terminal of which is grounded at 49. The other terminals 50, 51, and 52 of these lamps, are connected to the contact bars 43 at A, B, and C, respectively. The ground 49 may be a part of the machine electrically continuous with the table 10 or 11. Thus the sheet or strip may complete the circuit of any one lamp by contacting its contact bar 43 and the table. Where the sheet or strip makes contact, the corresponding lamp will indicate the fact to the operator; and if less than all three indicate contact, he may move the sheet or strip accordingly until all three contacts are established, and all three lamps are lighted.

The electric system might be simply as above described, leaving it to the operator to start the shearing operation after he sees all lamps lighted. However, rapidity of operation is greatly increased by also placing in this system the motor 53, shown only in the diagram of Fig. 12, but understood to be the motor that drives the shear and causes the blades 9 and 8 to shear the sheet or strip which has been positioned as above described. The motor 53 is shown as a shunt-wound motor; but it will be understood that it may be of any desired type; and it will be understood that it is supplied with current from a suitable source, not shown, through the leads 54 and 55, the first of which is shown directly connected to one terminal of the motor. The other lead 35 is connected to one terminal of switch C″, which is in series with the other two switches B″ and A″, to a conductor 56 connected to the other terminal of the motor 53. Electro-magnets 57, 58, and 59 have cores 60 which move when the respective magnet is energized, to close the respective switch A″, B″, or C″. The coils of these magnets 57, 58, and 59 are, respectively, included in the conductors 50, 51, and 52 that lead from the respective lamps to the contact bars 43 at A, B, and C.

It will be seen that, just as a sheet or a strip must electrically connect at the bars 43 with all three lamps to signal a condition for shearing, the motor 53 will not have its circuit completed for operation unless all three relay switches A'', B'', and C'' are closed by the contact of the sheet or strip at all three points. When this automatic starting of the motor 53 is provided for, the three lamps have as their most important function the aid of the operator, to show him which way to move the sheet or strip to effect all three contacts necessary to properly position the sheet or strip for shearing. If he happened to establish all three contacts at the first trial, the motor would start and the shearing would be performed without his notice of the lamps. The operator will, of course, locate the sheet or strip longitudinally of the tables for shearing the required minimum amount from the end of the sheet or strip, before he begins pressing it against the gauge. Upon shearing one end of the sheet or strip, while on table 10 and gauged by the right hand gauge device, the operator may shift the sheet to table 11, gauging it by the left hand gauge device, and shearing the other end of the sheet.

In the use of the shear illustrated in Figs. 8 and 9, it will frequently be convenient to shear simultaneously the trailing end of a first strip and the leading end of a second. When this is done, the strips are positioned at 1 on each table, with their ends overlapping along the line of the shear knives 8 and 9. The strips are then correctly positioned, each by its appropriate gauge, and the shearing stroke is made. For an automatic operation, when this is done, and by reference to Fig. 12, it will be understood that one of the leads 54 or 55 is connected to the source of power through another series of relay switches corresponding to the relays A'', B'', and C'', controlled by contacts on the other gauge corresponding to A, B, and C. Thus, before the shearing stroke is automatically initiated by the relay switches, all of the lamps on each of the tables must be lighted, indicating that the two strips are in correct position for shearing.

It will be seen that by the use of my gauging device, the ends of the sheets or strips may be sheared in correct relationship for welding. If the strips, or either of them, are without camber, the uncambered strip will be sheared along a line perpendicular to its straight side edge. If either or both of the strips are cambered, the cambered strip will be sheared along a line radial to the curvature of the camber therein in the part contacted by the gauge. The current for energizing the lamps A', B', and C', etc., where the current is grounded to the table and must pass through the strip being sheared, will be a low voltage current preferably, so as to make precautions against shock unnecessary.

Numerous modifications may occur in practice, and while I have illustrated and described my invention rather specifically, I do not wish to be understood as being limited to such precise disclosure, but what I claim as new and desire to secure by Letters Patent, is:—

1. In combination in a device for operating upon strips which may have a camber, operating means, means providing a fixed location point and means providing movable location points, means for insuring the relative movement of said movable location means such that when the edge of a strip contacts all of said means, said strip will bear a predetermined relationship to said operating means.

2. In a shear, shearing means and strip locating means, said strip locating means comprising fixed means for contacting the edge of a strip and movable means for contacting the edge of a strip, and means for insuring relative movement of said movable means such that when the edge of a strip is brought into contact with all of said contacting means simultaneously, said strip will bear a predetermined relationship to said shearing means.

3. In a device for operating upon strip likely to have a camber, operating means and gauging means, said gauging means comprising means providing a fixed location point and means providing movable location points located progressively greater distances therefrom, and means for moving said movable location points in fixed relationship proportionate to their distance from said fixed point.

4. In a device for operating upon strip likely to have a camber, operating means and gauging means, said gauging means comprising means providing a fixed location point and means providing movable location points located progressively greater distances therefrom, means for moving said movable location points in fixed relationship proportionate to their distance from said fixed point, and means for indicating when the edge of a strip approached to said points makes simultaneous contact with all of them, whereby said strip may be located in a relation to said operating means determined by the curvature of the edge of said strip.

5. In a device for operating upon strip-like material likely to have a camber, operating means, means providing a fixed location point, arms pivoted for radial movement with respect thereto, means on said arms for making contact with the edge of a strip, the means on said arms lying at different distances from said fixed contact means, and an operating connection between said arms to insure simultaneous movement of each in proportion to the distance of the contact means thereon from said fixed contact means.

6. In a device for operating upon strip likely to have a camber, operating means and gauging means, said gauging means comprising means providing a fixed location point and means providing movable location points located progressively greater distances therefrom, means for moving said movable location points in fixed relationship proportionate to their distance from said fixed point, means for indicating when the edge of a strip approached to said points makes simultaneous contact with all of them, whereby said strip may be located in a relation to said operating means determined by the curvature of the edge of said strip, and automatic means for actuating said operating means when a strip edge makes simultaneous contact with all of said contact means.

7. In a device for operating upon strip-like material likely to have a camber, operating means, means providing a fixed contact point and means providing a plurality of movable contact points, means connected with said movable contact points for insuring a relative motion thereof such that said fixed and movable contact points will always lie in respective positions on a straight line embracing all of them, and on predetermined curves to either side of said straight line embracing all of them.

8. In a device for operating upon strip-like material likely to have a camber, operating means, means providing a fixed contact point and means providing a plurality of movable contact points, means connected with said movable contact points for insuring a relative motion thereof such that said fixed and movable contact points will always lie in respective positions on a straight line embracing all of them, and on predetermined curves to either side of said straight line embracing all of them, means for urging said movable contact points to a prearranged position.

9. In a device for operating upon strip-like material likely to have a camber, operating means, means providing a fixed contact point and means providing a plurality of movable contact points, means connected with said movable contact points for insuring a relative motion thereof such that said fixed and movable contact points will always lie in respective positions on a straight line embracing all of them and on predetermined curves to either side of said straight line embracing all of them, means for urging said movable contact points to a prearranged position, and means for indicating when the edge of a strip simultaneously contacts all of said contacting means.

10. In a device for operating upon strip-like material likely to have a camber, operating means, means providing a fixed contact point and means providing a plurality of movable contact points, means connected with said movable contact points for insuring a relative motion thereof such that said fixed and movable contact points will always lie in respective positions on a straight line embracing all of them and on predetermined curves to either side of said straight line embracing all of them, means for urging said movable contact points to a prearranged position, means for indicating when the edge of a strip simultaneously contacts all of said contacting means, said means comprising separate electric circuits for each of said contacting means and indicating means in said several circuits.

11. In a device for operating upon strip-like material likely to have a camber, operating means, means providing a fixed contact point and means providing a plurality of movable contact points, means connected with said movable contact points for insuring a relative motion thereof such that said fixed and movable contact points will always lie in respective positions on a straight line embracing all of them and on predetermined curves to either side of said straight line embracing all of them, means for urging said movable contact points to a prearranged position, and means for establishing an electrical circuit when a strip edge contacts all of said contacting means simultaneously and means for causing said circuit when established to initiate the operation of said operating means.

12. In a device for operating upon strip-like material likely to have a camber, operating means, means providing a fixed contact point and means providing a plurality of movable contact points, means connected with said movable contact points for insuring a relative motion thereof such that said fixed and movable contact points will always lie in respective positions on a straight line embracing all of them and on predetermined curves to either side of said straight line embracing all of them, means for urging said movable contact points to a prearranged position, means for indicating when the edge of a strip simultaneously contacts all of said contacting means, said means comprising separate electric circuits for each of said contacting means and indicating means in said several circuits, relays in the circuit of each of said indicating means, said relays being located in series in an electrical circuit, and means for causing the establishment of said electrical circuit to initiate the operation of said operating means.

13. In a shear for strip likely to have a camber, shearing means, a gauge having portions to contact the edge of a strip at a plurality of points, and means for causing said portions to bear a relationship with each other as to position such that a curved strip, when an edge thereof is brought into contact therewith, will be positioned in a predetermined relationship to said shearing means.

14. In a shear, shear knives, a shear table, a guiding means, said guiding means comprising means presenting a fixed location point and means presenting movable location points, means for moving said location points by distances having a fixed proportional relationship, and means for establishing an electric circuit when a strip edge is in contact with all of said location points.

EDWIN B. HUDSON.